United States Patent [19]
Platt

[11] Patent Number: 5,951,165
[45] Date of Patent: Sep. 14, 1999

[54] TEMPERATURE SENSOR

[75] Inventor: Robert John Platt, Randolph, N.J.

[73] Assignee: Exxon Research and Engineering Co., Florham Park, N.J.

[21] Appl. No.: 09/131,108

[22] Filed: Aug. 7, 1998

[51] Int. Cl.[6] .............................. G01K 1/14; G01K 7/04; H01L 35/02
[52] U.S. Cl. ..................... 374/179; 374/208; 136/230
[58] Field of Search .................................. 374/179, 120, 374/208, 147, 185; 136/224, 230, 233, 235

[56] References Cited

U.S. PATENT DOCUMENTS

| | | | |
|---|---|---|---|
| 2,483,350 | 9/1949 | Polye et al. | 136/233 |
| 2,749,753 | 6/1956 | Adams | 374/185 |
| 2,753,714 | 7/1956 | Perkins et al. | 374/185 |
| 3,061,806 | 10/1962 | Stevens | 374/185 |
| 3,531,993 | 10/1970 | Karn | 136/230 |
| 3,913,058 | 10/1975 | Nishio et al. | 136/235 |
| 4,830,515 | 5/1989 | Cortes | 374/208 |
| 4,904,091 | 2/1990 | Ward | 374/179 |
| 5,139,345 | 8/1992 | Schafer et al. | 374/179 |
| 5,642,717 | 7/1997 | Gilman et al. | 374/185 |

*Primary Examiner*—Diego Gutierrez
*Assistant Examiner*—Quyen Doan

[57] ABSTRACT

A temperature sensor includes an elongated cylindrical thermal body having a longitudinal bore therethrough. The body also has a first, closed, heat sensing end and a second, open end. At least one thermocouple is mounted within the bore of the thermal body heat conducting relationship with the heat sensing end and extends outwardly through the second end for connection to a signal measuring device. The heat sensing first end of the thermal body is provided with male threads for screwing the first end into a threaded cavity in metal surface such as a metal vessel wall. The thermal body at about its mid-section has a diameter greater than the diameter of the first end and is threaded around the circumference. The sensor includes a lock nut which screws over the mid section locking the thermal body to a vessel wall when it is screwed into the cavity provided in the wall to receive the heat sensing end.

6 Claims, 4 Drawing Sheets

TEMPERATURE SENSOR

FIELD OF THE INVENTION

This invention relates generally to temperature sensors and more particularly to temperature sensors especially suitable for sensing the temperature on the surface of a vessel such as the exterior surface of a process reactor.

BACKGROUND OF THE INVENTION

There are numerous instances in which it is very desirable, if not necessary, to monitor the surface temperature of a vessel. For example, monitoring the temperature of the exterior surfaces of process vessels, especially those used in exothermic processes, provides process operators with information that can be used to prevent vessel failure that could result if vessel design limits were to be exceeded.

Thus one object of the present invention is to provide a reliable sensor for monitoring the surface temperature of a metal vessel.

Another object of the invention is to provide a reliable sensor that can be replaced while the vessel is in service.

SUMMARY OF THE INVENTION

Basically, the temperature sensor of the present invention includes an elongated cylindrical thermal body having a longitudinal bore therethrough. The body also has a first, closed, heat sensing end and a second, open end. At least one thermocouple, is mounted within the bore of the thermal body in heat conducting relationship with the heat sensing end and extends outwardly through the second end for connection to a signal measuring device. The heat sensing first end of the thermal body is provided with male threads for screwing the first end into a threaded cavity in metal surface such as a metal vessel wall. The thermal body at about its mid-section has a diameter greater than the diameter of the first end and is threaded around the circumference. The sensor includes a lock nut which screws over the mid section locking the thermal body to a vessel wall when it is screwed into the cavity provided in the wall to receive the heat sensing end.

These and other features of the invention will be perceived from the detailed description which follows.

DETAILED DESCRIPTION

Figure 1:
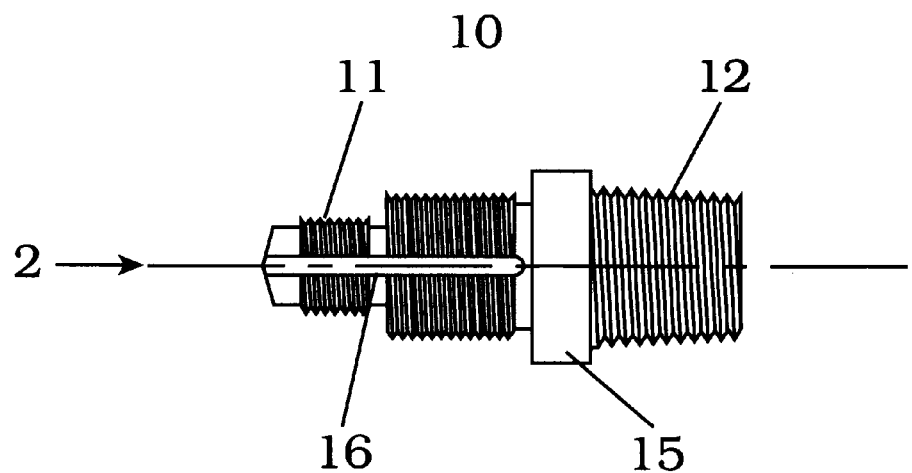
FIG. 1 is a horizontal schematic view of the thermal body of the sensor according to the invention.

The temperature sensor of the present invention includes an elongated thermal body designated by reference numeral 10 in the drawings. Referring first to FIG. 1, the thermal body 10 has a first, closed, heat sensing end 11 and a second end 12. The first end 11 includes male threads for screwing the first end into a female threaded cavity in a vessel wall. As can be seen, the diameter of the tubular body at about its mid-section 14 is larger than the diameter of the first end 11. The diameter of the second end 12 may be the same as the mid-section 14 but preferably will be slightly larger. The mid-section 14 has male threads for engaging a lock nut. Optionally, the second end 12 is threaded for attachment to an optional conduit. The tubular body 10 also is provided with a hexagonal section 15 so that the body 10 can be rotated with a wrench.

Figure 3:
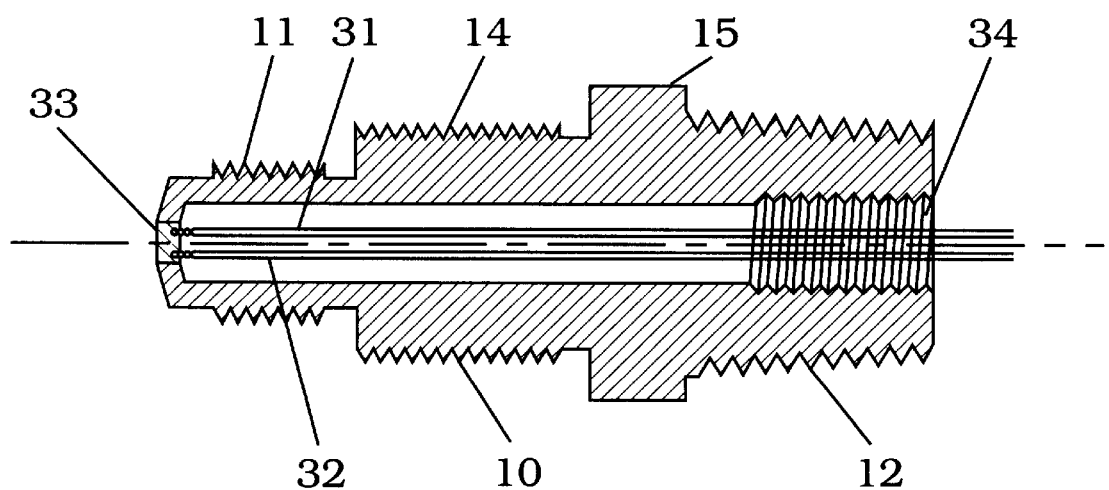
FIG. 3 is an exposed view of the thermal body with two thermocouples mounted therein.
Figure 5:
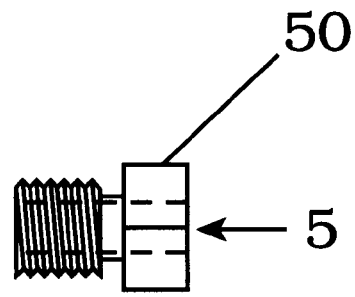
FIG. 5 is a schematic illustration of a retention plug.
Figure 6:
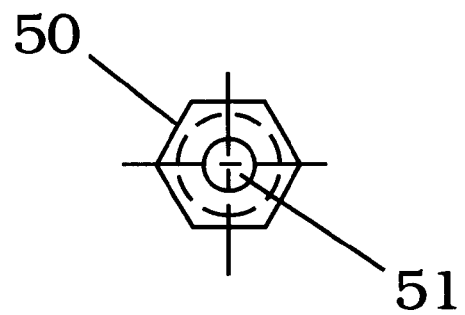
FIG. 6 is an end view of the retention plug in the direction of arrow 5 of FIG. 5.

At least one thermocouple is mounted within the thermal body 10. In a preferred embodiment shown in FIG. 3 two thermocouples, 31 and 32, are in heat conducting relationships with the heat sensing end 11. This is achieved by a weld 33. Preferably an insulating material (not shown) such as a ceramic insulating powder is packed into the thermal body 10 after the thermocouple is mounted therein. Optionally, but preferably, thermal body 10 is provided with internal threads 34 at second end 12 for receiving and engaging a retention plug 50 (shown in FIG. 5 and 6) which serves to prevent loss of any insulating material charged in the cavity of the thermal body 10 but which permits the thermocouples to pass through opening 51 for connection to appropriate instrumentation (not shown).

Figure 2:
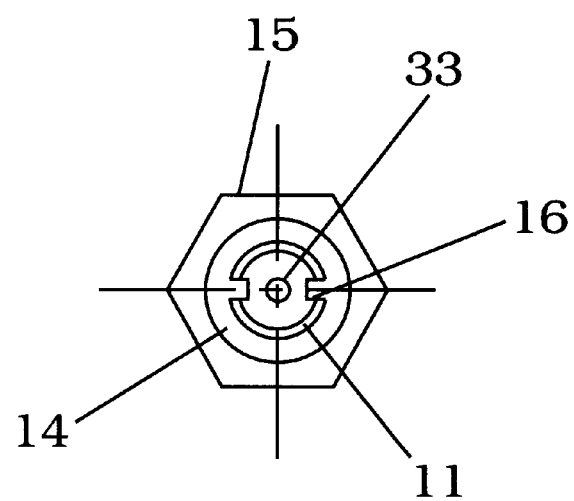
FIG. 2 is an end view in the direction of arrow 2 of FIG. 1.

In a particularly preferred embodiment at least one and especially two exterior longitudinal channels 16 extend from the first end 11 through the mid-section 14 so that the first end of thermal body 10 is exposed to ambient pressure only, thereby eliminating the risk of hydrogen build-up between the vessel bore cavity and the thermal body 10 when the sensor is mounted in the vessel wall. When two channels 16 are provided they preferably are at 180° with respect to each other as shown in FIG. 2.

Figure 4:
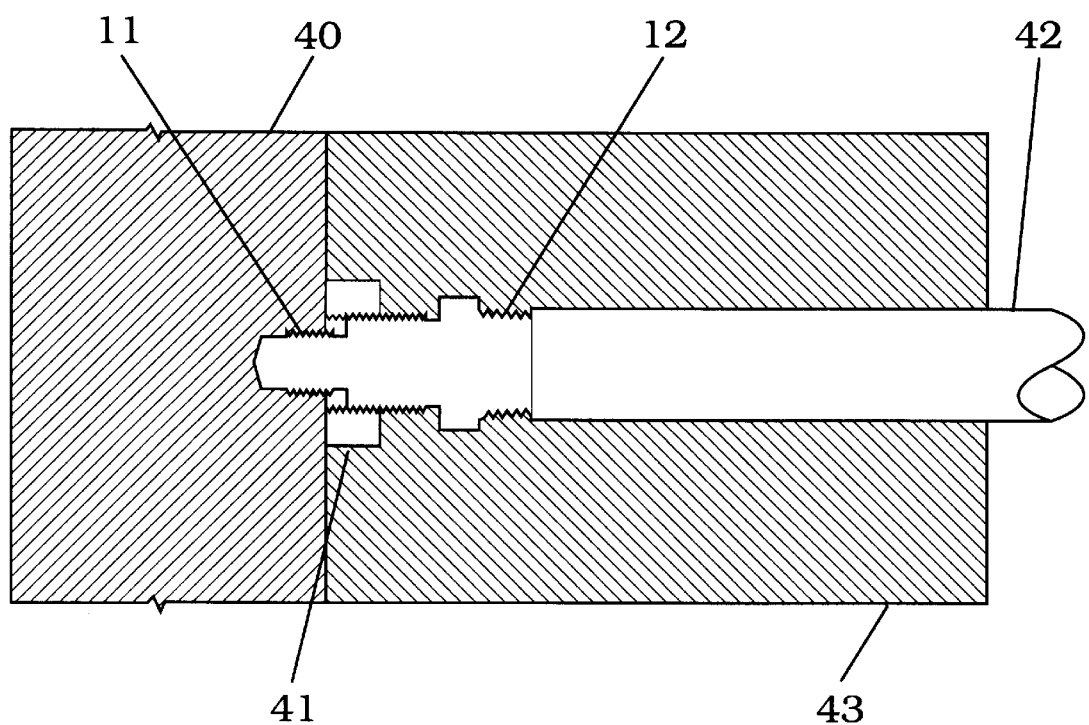
FIG. 4 is a schematic illustration of the sensor showing the thermal body mounted in a vessel wall and including a lock nut and optional conduit.

Referring now to FIG. 4, thermal body 10 is shown mounted in a vessel wall section 40. The wall section 40 has a cavity internally threaded and shaped to engage first end 11 in thermal contact with the vessel wall. A lock nut 41 is provided to insure that the thermal body 10 will remain in close contact with the vessel wall and will not vibrate loose. As shown, a conduit 42 is screwed on to second end 12 and the thermocouple wires pass through conduit 42 to appropriate instrumentation (not shown). In the embodiment shown, the vessel has external insulation 43. In the practice of the present invention it is desirable to fabricate the thermal body from a metal that has a greater coefficient of expansion than that of the metal surface to which it is to be joined. This tends to cause the thermal body to be forced into the cavity in the metal surface under conditions of use.

Although this invention has been described broadly and with reference to preferred embodiments obviously many modifications and variations are possible which are within the spirit and scope of the claimed invention.

What is claimed is:

1. A temperature sensor for sensing the temperature of a metal surface having a threaded cavity therein adapted to receive the sensor, the sensor comprising:

an elongated tubular body having a closed, first, heat sensing end; a second, open end and a mid-section;

at least one thermocouple mounted within the tubular body in heat sensing relationship with the heat sensing end, the thermocouple extending outwardly through the second end;

threads on the first end for mounting the sensor in a threaded cavity in the metal surface;

the tubular body having a diameter at the mid-section larger than the diameter at the first end, the mid-section having male threads;

lock nut means adapted to engage the male threads of the mid-section and secure the tubular body to the metal surface.

2. The sensor of claim 1 wherein the tubular body includes at least one exterior longitudinal channel extending from the first end through the mid-section.

3. The sensor of claim 2 wherein the tubular body has internal threads and wherein the sensor includes a retention plug adapted to screw into the second end.

4. In a system for measuring the surface temperature of a vessel wall provided with a threaded cavity therein for engaging a temperature sensor, the temperature sensor comprising:

an elongated tubular body having a closed, first heat sensing end; a second open end and a mid-section;

at least one thermocouple mounted within the tubular body in heat sensing relationships with the heat sensing first end; threads on the first end for mounting the sensor in the threaded cavity in the vessel wall whereby the sensor is in thermal contact with the wall;

lock nut means adapted for security the sensor to the vessel wall whereby loosening of the sensor by vessel vibration is minimized; and at least one exterior longitudinal channel extending from the first end through the mid-section whereby the first end is exposed to ambient pressure.

5. The system of claim 4 wherein the sensor includes a threaded retention plug and the second end is adapted to secure and engage the retention plug.

6. A sensor for sensing the exterior surface temperature of a metal vessel having a threaded cavity in the exterior surface of the vessel, the sensor comprising:

a tubular body having a closed, first end, an open second end and a mid-section, the first end having threads thereon for mounting the sensor in the threaded cavity;

male threads on the mid-section;

at least one thermocouple mounted within the tubular body in heat sensing relationship with the first end;

locking means adapted to engage the male threads of the mid-section for securing the tubular body to the vessel when the first end is within threaded cavity;

at least one exterior longitudinal channel extending from the first end through the mid-section; and a retention plug adapted to be received in the second end, the retention plug having an opening which permits the thermocouple to pass through.

* * * * *